US010615599B2

(12) United States Patent
Bennett

(10) Patent No.: US 10,615,599 B2
(45) Date of Patent: Apr. 7, 2020

(54) EFFICIENT LOW-VOLTAGE GRID FOR A CATHODE

(71) Applicant: John Bennett, Sammamish, WA (US)

(72) Inventor: John Bennett, Sammamish, WA (US)

(*) Notice: Subject to any disclaimer, the term of this patent is extended or adjusted under 35 U.S.C. 154(b) by 106 days.

(21) Appl. No.: 16/034,109

(22) Filed: Jul. 12, 2018

(65) Prior Publication Data

US 2020/0021112 A1 Jan. 16, 2020

(51) Int. Cl.
*H02J 3/14* (2006.01)
*H02M 5/42* (2006.01)
*H01J 1/34* (2006.01)

(52) U.S. Cl.
CPC .... *H02J 3/14* (2013.01); *H01J 1/34* (2013.01); *H02M 5/42* (2013.01)

(58) Field of Classification Search
CPC ................ H02J 3/14; H01J 1/34; H02M 5/42
See application file for complete search history.

(56) References Cited

U.S. PATENT DOCUMENTS

| 1,788,553 | A | 1/1931 | Thomas |
| 2,197,042 | A | 4/1940 | Gray |
| 2,218,340 | A | 10/1940 | Maurer |
| 2,598,677 | A | 6/1952 | Depp |
| 2,754,428 | A | 7/1956 | Franks |
| 2,789,240 | A | 4/1957 | Martin |
| 3,436,651 | A | 4/1969 | Helms |
| 4,106,937 | A * | 8/1978 | McTeague ............ G03F 7/0035 313/397 |
| 4,465,934 | A | 8/1984 | Westerberg et al. |
| 4,771,168 | A | 9/1988 | Gundersen et al. |
| 5,057,740 | A | 10/1991 | Kirkman-Amemiya |
| 5,077,597 | A | 12/1991 | Mishra |
| 5,109,829 | A | 5/1992 | Herden et al. |
| 5,319,193 | A | 6/1994 | Rogers et al. |
| 5,430,305 | A | 7/1995 | Cole, Jr. et al. |
| 5,773,922 | A | 6/1998 | Lee et al. |
| 5,793,152 | A | 8/1998 | Tang et al. |
| 5,831,382 | A | 11/1998 | Bilan et al. |

(Continued)

FOREIGN PATENT DOCUMENTS

EP 0476975 A1 3/1992
EP 3032568 A1 6/2016
(Continued)

OTHER PUBLICATIONS

Wikipedia contributors. "Control grid." Wikipedia, The Free Encyclopedia. Wikipedia, The Free Encyclopedia, Dec. 22, 2018. Web. Dec. 18, 2019. (Year: 2019).*

(Continued)

*Primary Examiner* — Daniel J Cavallari
(74) *Attorney, Agent, or Firm* — Davis Wright Tremaine LLP

(57) ABSTRACT

A control grid for a cathode including a plurality of grid cells, with each grid cell including a deflecting layer, an insulating layer and a grid layer. The deflecting layer is in contact with the cathode; the insulating layer is between the deflecting layer and the grid layer; and the grid layer is at a positive voltage relative to the cathode, such that a voltage gradient is created between the cathode and the grid layer which accelerates electrons emitted by the cathode away from the cathode.

18 Claims, 11 Drawing Sheets

(56) References Cited

U.S. PATENT DOCUMENTS

| | | | |
|---|---|---|---|
| 5,969,480 | A | 10/1999 | Schmolla et al. |
| 6,220,914 | B1 | 4/2001 | Lee et al. |
| 6,297,489 | B1 | 10/2001 | Suyama et al. |
| 6,437,360 | B1 | 8/2002 | Cho et al. |
| 6,512,385 | B1 | 1/2003 | Pfaff et al. |
| 6,917,058 | B2 | 7/2005 | Niigaki et al. |
| 7,646,149 | B2 | 1/2010 | Naaman et al. |
| 7,816,866 | B2 | 10/2010 | Nakajima et al. |
| 8,143,566 | B2 | 3/2012 | Levy |
| 8,487,234 | B2 | 7/2013 | Levy |
| 9,305,734 | B2 | 4/2016 | Jacquet et al. |
| 2002/0113151 | A1 | 8/2002 | Forber Jones et al. |
| 2003/0067312 | A1 | 4/2003 | Pfaff et al. |
| 2004/0056279 | A1 | 3/2004 | Niigaki et al. |
| 2005/0017648 | A1 | 1/2005 | Naaman et al. |
| 2005/0018467 | A1 | 1/2005 | Naaman et al. |
| 2006/0125368 | A1 | 6/2006 | Hwu et al. |
| 2007/0096648 | A1 | 5/2007 | Nakajima et al. |
| 2007/0188090 | A1 | 8/2007 | Kimiya et al. |
| 2010/0290593 | A1 | 11/2010 | Legagneux et al. |
| 2012/0181429 | A1 | 7/2012 | Levy |
| 2013/0026917 | A1 | 1/2013 | Walker et al. |
| 2014/0113828 | A1 | 4/2014 | Gilbert et al. |
| 2014/0227548 | A1 | 8/2014 | Myrick |
| 2014/0367248 | A1 | 12/2014 | Goldfarb |
| 2014/0370423 | A1 | 12/2014 | Goldfarb |
| 2015/0004722 | A1 | 1/2015 | Yamazaki et al. |
| 2015/0287570 | A1 | 10/2015 | Hayashi et al. |
| 2016/0133424 | A1 | 5/2016 | Chou et al. |
| 2016/0163531 | A1 | 6/2016 | Hiruma et al. |
| 2016/0322192 | A1 | 11/2016 | Hayashi et al. |
| 2016/0359427 | A1 | 12/2016 | Ghosh et al. |

FOREIGN PATENT DOCUMENTS

| | | |
|---|---|---|
| RU | 2589722 C1 | 7/2016 |
| SU | 1535257 A1 | 7/1992 |
| WO | 2015175765 A1 | 11/2015 |

OTHER PUBLICATIONS

"12 pulse bridge with thyristor valves.png," Wikimedia Commons, last edited Nov. 16, 2016 [retrieved Aug. 28, 2016], https://commons.wikimedia.org/wiki/File:12_pulse_bridge_with_thyristor_valves.png, three pages.

"DESERTEC-Map large.jpg," Wikimedia Commons, last edited May 30, 2015 [retrieved Aug. 28, 2017], https://commons.wikimedia.org/wiki/File:DESERTEC-Map_large.jpg, four pages.

"FZ1200R45HL3 Technical Information," Infineon, product data sheet, Aug. 19, 2014, nine pages.

"High Voltage Direct Current Transmission—Proven Technology for Power Exchange," Siemens AG, Mar. 2007, Order No. E50001-U131-A92-V2-7600, 48 pages.

"How HVDC Works," Clean Line Energy Partners, copyright 2010-2017 [retrieved Aug. 28, 2017], http://www.cleanlineenergy.com/technology/hvdc/how, two pages.

"HVDC converter," Wikipedia, last edited Jul. 18, 2017 [retrieved Sep. 1, 2017], https://en.wikipedia.org/wiki/HVDC_converter, 13 pages.

"HVDC Inter-Island," Wikipedia, last edited Mar. 2, 2017 [retrieved Aug. 28, 2017], https://en.wikipedia.org/wiki/HVDC_Inter-Island, 12 pages.

"Insulated-gate bipolar transistor," Wikipedia, last edited Aug. 30, 2017 [retrieved Sep. 1, 2017], https://en.wikipedia.org/wiki/Insulated-gate_bipolar_transistor, four pages.

"Mercury Arc Valve, Radisson Converter Station, GillamMB.jpg," Wikimedia Commons, last edited Dec. 31, 2014 [retrieved Aug. 28, 2107], https://commons.wikimedia.org/wiki/File:Mercury_Arc_Valve,_Radisson_Converter_Station,_Gillam_MB.jpg, four pages.

"Pole 2 Thyristor Valve.jpg," Wikimedia Commons, last edited Nov. 27, 2016 [retrieved Aug. 28, 2017], https://commons.wikimedia.org/wiki/File:Pole_2_Thyristor_Valve.jpg, two pages.

"Transformation," Omexom Power & Grid, Jan. 2011, 1 page.

"Ultra High Voltage Direct Current system (UHV DC)," Siemens, copyright 2002-2017 [retrieved Aug. 28, 2017], https://www.energy.siemens.com/hq/en/power-transmission/hvdc/innovations/uhv-dc.htm#content=Description, four pages.

Bahrman, "HVDC Technology: Line Commutated Converters," 2014 IEEE/PES Transmission & Distribution Conference & Exposition, Apr. 15, 2014, 31 pages.

Canelhas, "High Voltage Direct Current (HVDC) Technology," Technical presentation—Alstom Grid, Sep. 22, 2010, 22.

Davies et al., "HVDC PLUS—Basics and Principle of Operation," Special Edition for Cigré Exposition, Siemens Energy Sector, Aug. 10, 2008, 24 pages.

International Search Report and Written Opinion dated Mar. 29, 2018, International Patent Application No. PCT/US2017/067970, filed Dec. 21, 2017, 7 pages.

Johnson, "SiC/GaN Poised for Power," EE Times, Sep. 1, 2015 [retrieved Aug. 28, 2017], http://www.eetimes.com/document.asp?doc_id=1327577, three pages.

Kirby, "Panel Session: State of HVDC Technologies," US DOE Grid Tech: Applications for High-Voltage Direct Current Transmission Technologies, Apr. 22, 2013, 20 pages.

Sheng et al., "Reliability Enhancement of HVDC Transmission by Standardization of Thyristor Valves and Valve Testing," Sixth International Conference on Power T&D Technology, Nov. 10, 2007, 6 pages.

Siegmund et al., "Development of GaN photocathodes for UV detectors," Nuclear Instruments and Methods in Physics Research Section A: Accelerators, Spectrometers, Detectors and Associated Equipment 567(1):89-92, published online Jun. 13, 2006, print publication Nov. 1, 2006.

Zavahir et al., "Design Aspects of the Integration of the New Zealand HVDC Pole 3 Project," SCB4 Colloquium 2011, Oct. 2011, 14 pages.

Hasegawa et al., "Development of a Thyristor Valve for Next Generation 500KV HVDC Transmission Systems," IEEE Transactions on Power Delivery 11(4):1783-1788, Oct. 1996.

International Search Report and Written Opinion dated Oct. 31, 2019, International Patent Application No. PCT/US2019/045665, filed Aug. 8, 2019, 7 pages.

International Search Report and Written Opinion, dated Oct. 31, 2019, International Patent Application No. PCT/US2019/041361, filed Jul. 11, 2019, 7 pages.

* cited by examiner

EFFICIENT LOW-VOLTAGE GRID FOR A CATHODE

BACKGROUND

A photo-electric rectifier can be used as a switch or modulator in high-voltage systems. A photo-electric rectifier provides two electrodes, a photo-cathode and an anode, separated by a distance in a sealed vacuum tube. A photo-cathode is a negatively charged electrode that emits electrons when illuminated by a light source due to the photo-electric effect, wherein energy from photons striking the surface of the photo-cathode is acquired by electrons within the material of the photo-cathode, causing the electrons to be ejected. When the photo-cathode is illuminated, electrons are emitted, flowing through the interior of the vacuum tube to the positively charged anode, creating a flow of current between the two electrodes. When the illumination is switched off, no electrons are emitted, and the flow of current between the electrodes stops.

If high currents are generated in photo-electric rectifiers, this can cause problems as the system operates over time. Using high-voltage in a photo-electric rectifier can create impurities or contaminants. For example, high-voltage electrons bombarding the surface of the anode can cause the creation of ionized atoms in the vacuum tube. If the ionization of the atoms is caused by electrons being knocked off of the atoms, the atoms will become positive and will be attracted to the photo-cathode, which leads to the deposit of contaminants on the photo-cathode.

Reducing the voltage required within the photo-electric rectifier can reduce the creation of contaminants, but also robs the electrons that are ejected from the photo-cathode of energy, which suppresses their ability to travel to the anode to generate current. In other words, reducing the voltage required within the photo-electric rectifier can slow the rate that electrons clear away from the surface and can suppresses the fraction of electrons that will travel to the anode to become current. Using a traditional control grid with a positive voltage relative to the photo-cathode, such as those used historically in vacuum tubes, can help accelerate electrons toward the anode, but the relatively positive voltage of a typical control grid can also draw in and collect some percentage of those electrons, preventing them from completing the circuit to the anode, causing a drop in efficiency.

There exists a need for an efficient photo-electric rectifier which can operate at a lower voltage to reduce contamination while providing efficient, reliable operation in high-power systems.

Figure 1A:
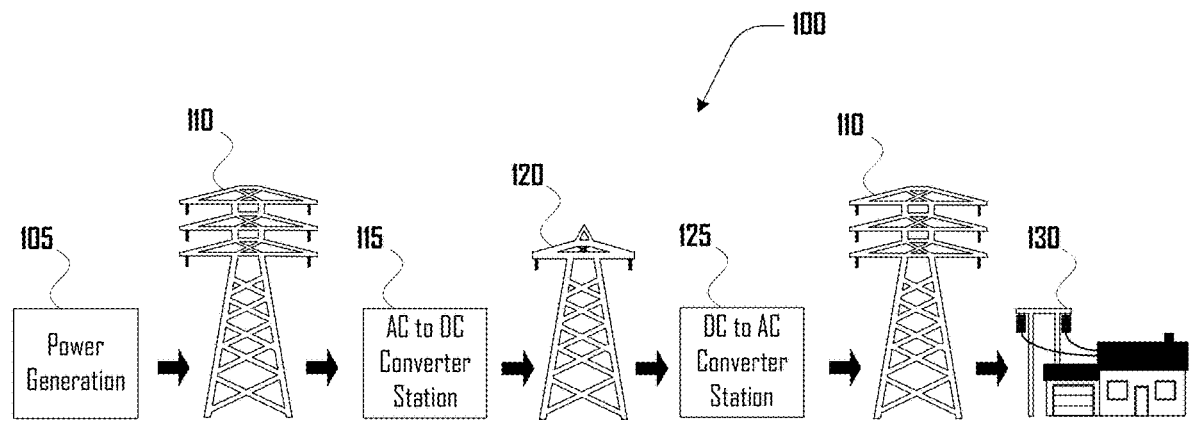
FIG. 1A is an exemplary diagram illustrating an embodiment of a high-power transmission system in which an embodiment of a controlled photo-electric switch may be used.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include methods and systems for controlling the flow of electrons emitted by a cathode as they travel toward an opposing anode. Example embodiments of the invention can be used with photo-cathodes (for example, a photo-cathode in a high-voltage rectifier), with current dispenser cathodes, or with any other appropriate type of low-voltage, electron-emitting electrode. Although the examples and illustrations used throughout this specification describe a high-voltage rectifier comprising a photo-cathode and anode enclosed in a vacuum, these examples are not intended to be limiting. Other variations are within the spirit of this disclosure. Throughout this specification, the terms "photo-cathode", "cathode", "emitting cathode", and "electron-emitting cathode" shall be used interchangeably. Additionally, it should be clear that the present examples can be applied to a switch and/or rectifier. For example, in some embodiments a switch only works for current in one direction, but the ability to control the current makes it a switch.

In an example embodiment, a photo-electric rectifier provides two electrodes, a cathode and an anode, separated by a distance in a sealed vacuum tube. The cathode is a photo-cathode which is negatively charged and emits electrons when illuminated by a light source due to the photo-electric effect, or photoemission. In photoemission, energy from photons striking the surface of the photo-cathode is acquired by electrons within the material of the photo-cathode, causing the electrons to be ejected. When the photo-cathode is illuminated, electrons are emitted, flowing through the interior of the vacuum tube to the positively charged anode, creating a flow of current between the two electrodes. Current flow is modulated by the amount of light falling upon the photo-cathode. The current flow is reduced to zero when light is removed from the photo-cathode.

Modern photo-cathode materials permit construction of a broad photo-cathode surface which can supply several hundred amperes of current, given adequate illumination. In some embodiments of the invention, there may be several centimeters of distance separating the photo-cathode from the anode, allowing for hundreds of thousands of volts to be blocked by the vacuum gap. This makes it possible to switch megawatts of power with a single switch or rectifier device. The upper power limits for a device are set by the ability to remove heat from the invention and by the voltages which the external electrical loads may generate in opposition to fast switching.

The anode operates at a positive voltage relative to the cathode. The anode may be any appropriate conductor or semiconductor material known to those in the arts capable of receiving current flow. Electrons emitted by the photo-cathode are attracted across the vacuum to the positive voltage of the anode, creating current flow. In some example embodiments, the anode may be narrower or wider than the cathode. In some example embodiments, the anode may be a copper plate parallel to the photo-cathode. In other example embodiments, a copper plate with a carbon or carbide alloy coating on the surfaces where electrons arrive may be used.

Some embodiments of the present invention may include optional control grids or control rings which allow electron flow to be improved at low voltages. A control grid may be designed as a fine conductive mesh placed near to and substantially parallel with the cathode at small positive voltage relative to the cathode. This control grid enhances low voltage operation by accelerating electrons away from the cathode even when there is a low overall voltage differential with the anode. The control grid allows electrons to cross a relatively large distance through the vacuum tube to the anode at low voltage and high efficiency. In some embodiments, the control grid may also be used, possibly combined with varying illumination levels, to suppress current flow by applying a negative voltage to the control grid relative to the cathode.

In some embodiments, one or more control rings may be incorporated surrounding the cathode. The one or more control rings may have a zero or negative voltage relative to the photo-cathode. In this manner, the control ring(s) may be used to steer electrons toward the anode and reduce stray electrons reaching the walls of the vacuum tube.

Traditional control structures such as those mentioned above can help accelerate electrons toward the anode, but, because of their positive voltage relative to the cathode, can also draw in and collect some percentage of those electrons, preventing them from completing the circuit to the anode, causing a drop in efficiency. In an embodiment, a photo-electric cathode can be equipped with a control grid structure which is in contact with the cathode in order to generate intense voltage differentials at the micron scale using low voltages. By placing the control grid in direct contact with the cathode, a steep electric field gradient can be generated such that the majority of electrons emitted by the cathode will move into the space beyond the grid and flow toward the anode, even if the anode is not at a large, positive voltage relative to the cathode. This steep gradient, induced by a micron-scale grid, allows the cathode to support an intense current without electron congestion at the cathode surface which would suppress high currents. The use of low-voltage differentials permits the cathode to be more efficient. The low voltages also reduce cathode damage by avoiding the creation of anions from trace atoms in the vacuum.

In an embodiment, the control grid is placed on top of a rigid support structure, which in turn is placed in direct contact with the surface of the cathode, allowing the support structure to remain at zero volts relative to the cathode. The support structure forms a type of mesh or grid, outlining a series of walled cells on top of the cathode. The control grid is a conductive top layer on the walls of the cells, which can be separated from the bottom support structure by an insulating layer in some embodiments. Alternate embodiments may introduce additional layers, or use different materials in their construction, as will be made clear in the figures.

This layered approach forms a set of walled cells, with the grid as a conductive top layer on the wall of the cells. This layered control structure allows an intense electric potential gradient to be created using a relatively low voltage applied microns above the surface of the cathode. Because the bottom layer of the support structure is kept at zero volts relative to the cathode, a relatively small voltage on the control grid layer creates the intense potential gradient. This potential gradient can be used to accelerate electrons away from the cathode, permitting high current operation at about 1,000 times lower voltage and power dissipation than that required by typical devices in operation today. The use of a lower voltage also reduces the likelihood of creating contaminants through ionization, increasing the lifetime of the photo-cathode.

The design of the control grid can also introduce electron "optics" features, which can steer the electrons away from the control grid, reducing loss from electrons diverted into the grid itself and increasing the efficiency of current flow through the device toward the anode.

Turning now to the figures, the invention will be described in more detail. FIG. 1A is an exemplary diagram illustrating an embodiment of a high-power transmission system in which an embodiment of the invention may be used. The diagram shows a typical transmission path for power from the source of the power (for example, a power generation plant or source of renewable energy) to the distribution lines that deliver power to the end customers (for example, businesses and homes).

High-voltage alternating current (HVAC) power is generated at a power generation source 105. The power generation source 105 may be a power plant (for example, a hydroelectric dam, a fossil fuel power station, a nuclear power plant, or a wind farm). The HVAC power generated at the power generation source 105 is carried over AC transmission lines 110 to an AC to DC converter station 115 (also known as a rectification station). The AC to DC converter station 115 then converts the HVAC electric power to high-voltage direct current (HVDC) power, which can then be transmitted long distances over DC transmission lines 120. Power transmission using HVDC has advantages over transmission using HVAC, but these advantages include requiring fewer transmission towers, smaller, less expensive transmission towers, and a smaller environmental impact (smaller "footprint").

The DC transmission lines 120 deliver the HVDC power to a DC to AC converter station 125 (also known as an inversion station), where the HVDC power is converted back into HVAC power. The HVAC power is then carried over another set of AC transmission lines 110 and delivered to distribution lines 130, where the power is stepped down using transformers to voltage levels appropriate for end customers (businesses, homes, etc.)

For the purposes of this specification, the AC to DC converter station 115 and the DC to AC converter station 125, as well as converter stations which convert from one level of AC power to another level of AC power, or from one level of DC power to another level of DC power, shall collectively be referred to as "power conversion stations." However, the term "station" should not be construed to be limiting in any way, and is not meant to imply or require a specific architectural structure or embodiment. As used herein, a "power conversion station" shall be synonymous and interchangeable with the term "power conversion circuit."

The control grid described herein can be a component in a high-voltage switch, such as a photo-electric rectifier. The high-voltage switch can be a component of the AC to DC converter station 115 and/or the DC to AC converter station 125 of FIG. 1A. The high-voltage switch acts as an electrical switch which allows current to flow through it in one direction, and this property allows the switch to be used in the rectification and inversion processes needed to convert from HVAC to HVDC and back again. This is best illustrated by examples, such as those shown in FIGS. 1B and 1C.

It should be noted that, although a typical switch allows current to flow through it in one direction only, it would be possible to construct a switch using the principles described herein that would allow current to pass in both directions, as dictated by the needs of the application.

Figure 1B:
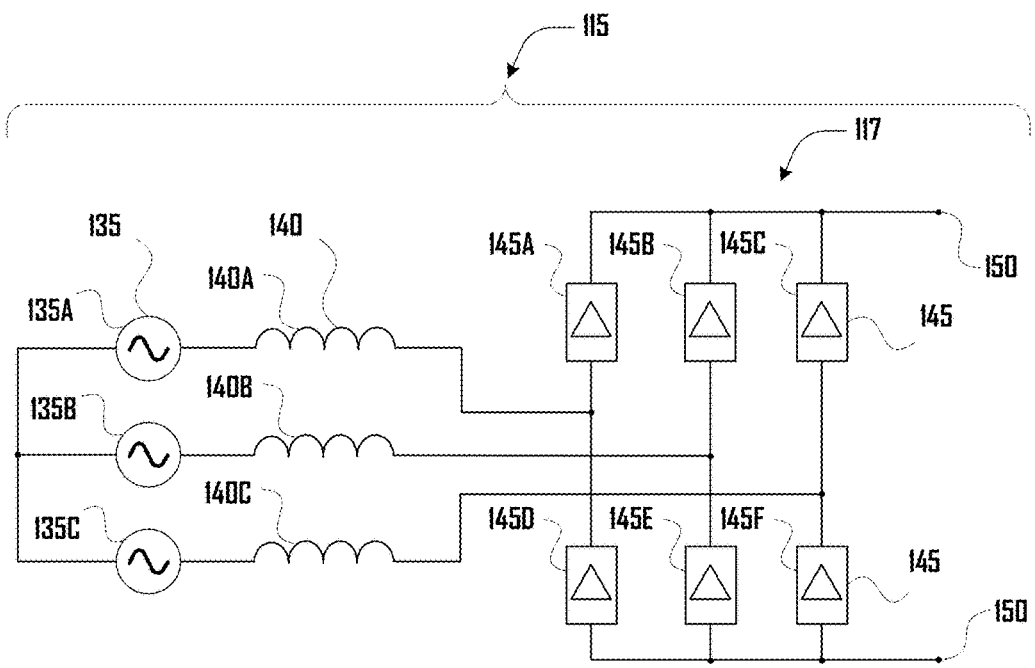
FIG. 1B is an exemplary diagram illustrating an embodiment of an electrical circuit for the conversion of high-voltage AC power to high-voltage DC power.

Turning now to FIG. 1B, we see an example embodiment of the high-voltage AC to DC converter station 115 of FIG. 1A. Note that the embodiment shown in FIG. 1B is an example only for teaching purposes and not meant to be limiting in any way.

An exemplary AC to DC converter station 115 can implement a power conversion circuit as shown in FIG. 1B. This power conversion circuit takes in three phases, with each phase having an AC generator 135 and an inductor 140. Each phase of the generator 135 outputs an AC voltage signal across the inductors 140 which is a sine wave, with the voltage generated constantly changing from 0 volts up to a maximum positive voltage, then decreasing back down to 0 volts where the voltage becomes negative, then the voltage changes down to a maximum negative voltage and then returns back to 0 volts again.

The AC phase voltages seen on inductors 140A, 140B, and 140C are connected to a switch circuit 117 comprising (in this example) six switching elements or valves 145. These valves 145 allow current to flow in only one direction, as indicated by the direction of the triangle shown on each valve 145. In normal operation, only two of the six valves 145, one from the top row (values 145A, 145B, and 145C) and one from the bottom row (145D, 145E, and 145F), are conducting (allowing current to pass) at any one time. In this manner, the two conducting valves 145 connect two of the three AC phase voltages seen at the inductors 140 in series. For example, if valves 145A and 145F are conducting, the DC output voltage seen across terminals 150 would be calculated as the voltage across inductor 140A minus the voltage across inductor 140C. The combination of valves shown in the example of FIG. 1B can be used for converting three phase HVAC into HVDC.

Figure 1C:
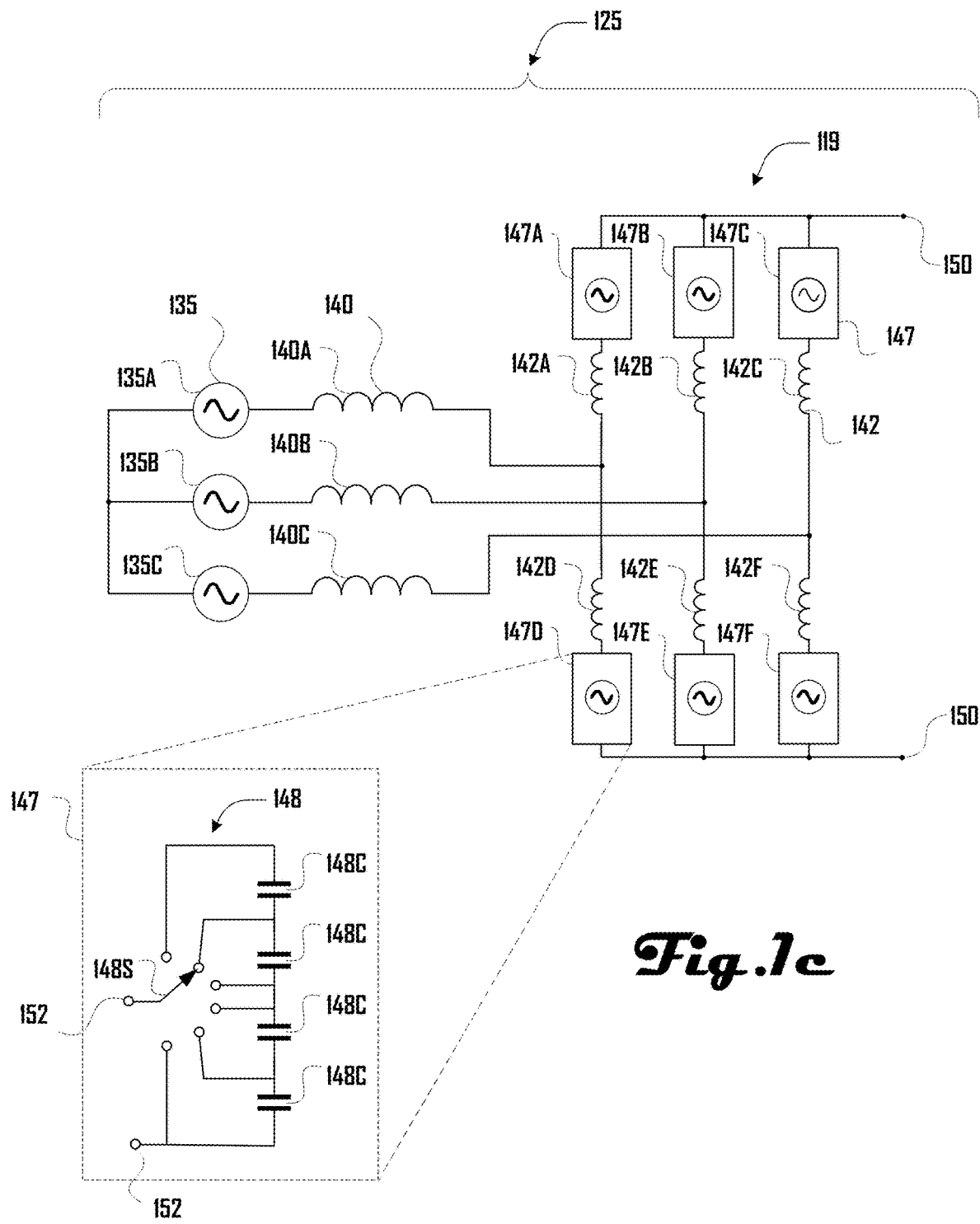
FIG. 1C is an exemplary diagram illustrating an embodiment of an electrical circuit for the conversion of high-voltage DC power to high-voltage AC power.

Turning now to FIG. 1C, we see an example embodiment of the high-voltage DC to AC converter station 125 of FIG. 1A. Note that the embodiment shown in FIG. 1C is an example only for teaching purposes and not meant to be limiting in any way.

An exemplary DC to AC converter station 125 can implement a power conversion circuit as shown in FIG. 1C. The power conversion circuit shown is an example of a modular multi-level converter (MMC). In some embodiments, an MMC power conversion circuit uses a number of valve submodules 147 and inductors 142 (such as shown in subcircuit 119) to convert DC power seen at terminals 150 into three-phase AC power at phases 135. Each valve submodule 147 acts as a controllable voltage source capable of generating various levels of voltage. Each valve submodule 147 does this by implementing switching circuit 148, shown in the close up view of valve 147 shown in the lower left of FIG. 1C. Each switching circuit 148 can be comprised of a number of capacitors 148C. Each capacitor 148C is either bypassed or connected into the switching circuit 148 by switch 148S. One possible implementation of switch 148S uses one or more embodiments of the high-voltage photo-electric switch described herein.

By controlling the timing and state of switch 148S, various combinations of storage capacitors 148C can be included in switching circuit 148, creating varying levels of voltage across output terminals 152. These varying levels of voltage can be used to create a stepped voltage waveform that approximates the sine wave of an AC signal.

The valves 145 of FIG. 1B can be unidirectional switches, each of which can allow current to flow through them in the direction indicated when engaged. One possible implementation of these valves 145 is one or more embodiments of the high-voltage photo-electric switch described herein. Similarly, one or more embodiments of the high-voltage photo-electric switch described herein can be used to implement the switching circuit 148 of FIG. 1C. As previously noted, a high-voltage photo-electric switch, such as that described in the figures and examples herein, is used as one possible example to illustrate the advantages of the control grid of the present invention. Other embodiments are possible which are within the scope of the present disclosure. For example, a rectifier or switch using a current dispenser cathode instead of the photo-cathode of the examples can be used.

Figure 2:
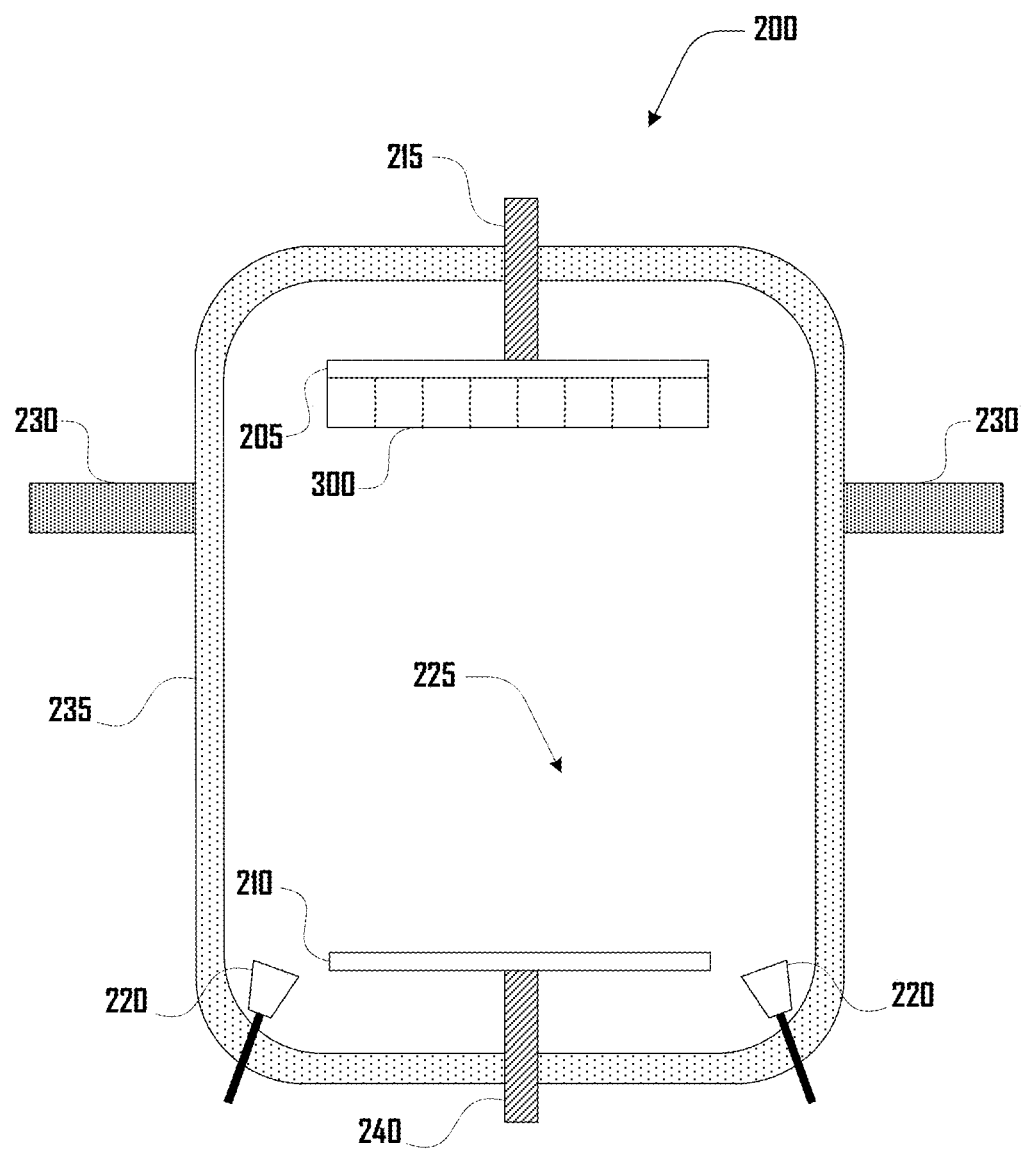
FIG. 2 is an exemplary diagram illustrating an embodiment of a controlled photo-electric switch and grid.

FIG. 2 is an exemplary diagram illustrating one embodiment of a controlled photo-electric switch 200. It should be noted that the photo-electric switch 200 of FIG. 2 can be used as the implementation of valves 145 in FIG. 1B.

Returning to FIG. 2, an input electrical conductor 215 connects to a photo-cathode 205. The end of the electrical conductor 215 not connected to the photo-cathode 205 can be connected to an external electrical circuit (not shown), such as the rectification circuit 117 illustrated in FIG. 1B. The photo-cathode 205 can be separated by a vacuum 225 from a conductive anode 210, which in turn can be connected to an output electrical conductor 240 connected to an external electrical circuit (not shown). The external electrical circuit (not shown, but an example rectification electrical circuit 117 is shown in FIG. 1B) applies a voltage between photo-cathode 205 and the anode 210. The photo-electric switch 200 will control the flow of electrical current between the photo-cathode 205 and the anode 210.

Photo-cathode 205 surfaces emit electrons when the energy per photon is comparable to or greater than the electronic work function characteristic of the surface. This transition is not exact because some electrons will have additional thermal energies or benefit from local variations in the surface, but in general photons with energy much less than the nominal work function will not enable electrons to be released.

Released electrons will pass through and be guided by an efficient control grid 300, which accelerates the electrons away from the photo-cathode 205 toward anode 210 by creating an intense, steep voltage gradient which pulls the electrons away from the surface of photo-cathode 205 using a positive voltage relative to the surface of the photo-cathode 205. Additional features of the control grid 300, to be described in detail herein, also steer the emitted electrons through the control grid 300 toward the anode 210 such that they are not inadvertently captured by the control grid 300 itself.

Various embodiments of the photo-electric switch 200 include light sources 220 capable of emitting light of a wavelength where the photon energy is sufficient to stimulate emission of electrons from the photo-cathode 205. In one example embodiment, this light can be provided by light emitting diodes (LEDs) with an optical path which leads the light to the photo-cathode 205. In another example embodiment, the light sources 220 can be a laser. It would be understood by one skilled in the art that any appropriate source of photons can be used, subject to the requirement that the wavelength of the light include photons with energy greater than the work function of the electron photo-emission surface (the photo-cathode 205). In some example embodiments, the amount of light emitted by light sources 220 can be modulated in pulse frequency and/or intensity to best control the photo-electric switch 200.

In some example embodiments, light sources 220 can be located inside a vacuum tube, also known as a vacuum chamber 235, positioned either to shine directly on the surface of the photo-cathode 205 facing anode 210 or to shine through the photo-cathode 205 from behind (as in the case of a transmission type photo-cathode). In other example embodiments, reflective surfaces can be installed in the vacuum chamber 235 to create a path for photons such that they strike the surface of the photo-cathode 205 with optimal efficiency, no matter their position relative to the emissive photo-cathode 205 surface. In yet other example embodiments, the source of illumination 220 can be located outside the vacuum chamber 235 with the light being directed into the interior of the vacuum chamber 235 and the photo-cathode 205 through transparent or translucent vacuum chamber 235 walls.

As previously described herein, light sources 220 can provide light of a wavelength short enough that the photon energy of the light exceeds the energy which is needed to cause the photo-cathode 205 to emit electrons through the photo-electric effect. The intensity of light sources 220 can determine the number of electrons which can be emitted from the photo-cathode 205. If light sources 220 are switched off, then the photo-electric effect will be stopped and no electrons will be emitted by the photo-cathode 205.

The photo-cathode 205 and the anode 210 are enclosed in a sealed vacuum chamber 235. The vacuum chamber 235 can be constructed of a durable, electrically insulating material and sealed and evacuated such that it creates a high-quality vacuum 225. For the purposes of this specification, the terms "vacuum" and "high-quality" vacuum" shall be used to define a vacuum of a quality such that there are not enough free-floating atoms or molecules within the vacuum chamber 235 to sustain an arc. In this way, when photons are not available from light sources 220, the vacuum 225 will not allow any current to flow between the photo-cathode 205 and the anode 210 even if the voltage differential between the photo-cathode 205 and the anode 210 is very high. The material from which the vacuum chamber 235 is constructed can be a good electrical insulator, made from materials with will not readily decay, evaporate, or otherwise shed material which might contaminate the surfaces contained within the photo-electric switch 200 and lead to unwanted electrical conduction pathways. In various embodiments, it can be desirable for the interior surfaces of the vacuum chamber 235 to be free of contaminants during operation to prevent additional electrical conduction pathways.

The current flow in the switch can be modulated by the amount of light falling upon the photo-cathode. For example, in some embodiments, current flow is reduced to zero when light is removed from the photo-cathode 205. Photoemission from the cathode 205 is a quantum process, allowing fast switching speeds in some embodiments, including but not limited to on the order of tens of picoseconds. The process of conversion from light to electrons can be almost perfectly linear, so some embodiments can be used to modulate power, as well as to switch it.

Some photo-cathode 205 materials can permit construction of a broad photo-cathode 205 surface which in some embodiments can supply several hundred amperes of current, given adequate illumination. In some embodiments, there can be a distance separating the photo-cathode 205 from the anode 210, allowing for voltage to be blocked by the vacuum gap 225. For example, in some preferred embodiments, the distance separating the photo-cathode 205 from the anode 210 can be on the order of centimeters including 1 cm, 5 cm 10 cm, 50 cm, or the like. In further preferred embodiments, the voltage blocked by the vacuum gap can be on the order of hundreds of thousands of volts, including 10,000 volts, 50,000 volts, 150,000 volts, or the like. This can make it possible for some embodiments to switch megawatts of power with a single switch device 200. In some embodiments, upper power limits for a device are set by the ability to remove heat from the switch 200 and by the voltages which the external electrical loads may generate in opposition to fast switching. Although some embodiments described herein can include a distance separating the photo-cathode 205 from the anode 210 on the order of centimeters, further embodiments, can include such a distance on the order of millimeters, decimeters, meters, or the like. Additionally, although some embodiments relate to a voltage blocked by a vacuum gap can be on the order of hundreds of thousands of volts, further embodiments blocked voltage can include 100 volts, 500 volts, 1,000 volts, 5,000 volts, or the like.

The photo-cathode 205 can comprise various suitable materials. For example, in some embodiments, the photo-cathode 205 can be constructed from a material capable of photo-emission, including, but not limited to, Si (Ag—O—Cs), antimony-cesium (Sb—Cs), bialkali (Sb—Rb—Cs/Sb—K—Cs), high-temperature or low-noise bialkali (Na—K—Sb), multialkali (Na—K—Sb—Cs), gallium-arsenide (GaAs), indium-gallium-arsenide (InGaAs), cesium-telluride (Cs—Te), cesium-iodide (Cs—I), and gallium-nitride (Ga—N), or the like.

In one example embodiment, a photo-cathode constructed of a gallium-nitride material with a trace layer of cesium can be used in conjunction with ultraviolet light (photons) with a wavelength shorter than 357 nm (more than 3.5 eV photon energy). In further examples, a photo-cathode constructed of a gallium-nitride material with a trace layer of cesium can be used in conjunction with ultraviolet light (photons) with a wavelength shorter than 370 nm, shorter than 365 nm, shorter than 360 nm, shorter than 355 nm, or the like.

Photo-cathode 205 materials can be selected based on the desired performance characteristics of the photo-cathode 205, including but not limited to the desired spectral response, thermoelectric and mechanical properties, and whether the photo-cathode 205 is a transmission type or a reflective type. Many different photo-cathode 205 materials exist and may be appropriate for use in the photo-cathode 205 of various embodiments. Some of these materials are best adapted for front illumination, while others work best with rear illumination.

In various embodiments, the anode 210 operates at a positive voltage relative to the photo-cathode 205. The anode 210 can be any appropriate conductor or semiconductor material known to those in the arts capable of receiving current flow. In some embodiments, the anode 210 can be constructed from a material, including but not limited to, tungsten, or the like, to improve the thermodynamic performance of the anode 210 (for example, to absorb heat during switch shut-off).

Electrons emitted by the photo-cathode 205 can be attracted across the vacuum to the positive voltage of the anode 210, creating current flow. In some example embodiments, the anode can be narrower or wider than the cathode. In some example embodiments, the anode 210 can be a copper plate parallel to the photo-cathode 205. In other example embodiments, a copper plate with a carbon or carbide alloy coating on the surfaces where electrons arrive can be used. In some embodiments, using a carbon or carbide alloy coating on the anode 210 can have a low rate of sputtering or ion emission under electron impact.

In another example embodiment, the anode 210 can be tungsten if the device needs to be tough enough to absorb high energy pulses during switching events or to operate with limited current resulting in high voltage between the photo-cathode 205 and anode 210. In another example embodiment, the anode 210 can itself comprise a photo-cathode 205, so that the device may operate to conduct current in both directions.

The photo-electric switch 200 can be installed in an electrical circuit (such as the example circuit of FIG. 1B) such that it is surrounded by a collar of insulating material 230, to avoid current bypassing the device. This electrical isolation can also be achieved by surrounding the photo-electric switch 200 itself with a vacuum. The photo-electric switch 200 should also be installed so as to avoid the creation of electrically conductive pathways with external surfaces and surrounding equipment.

When a high vacuum is established within the photo-electric switch 200, and all surfaces are properly insulated or isolated, electricity can only flow when the light sources 220 are on and causing electrons to be emitted from the photo-cathode 205 through the photo-electric effect. In some embodiments, the current can only flow in one direction, when the photo-cathode 205 potential is sufficiently negative relative to control grid 300 and/or anode 210. The amount of current flowing through the device depends upon the number of electrons released by the photo-cathode 205, and is therefore modulated by the intensity of the light sources 220.

Figure 3:
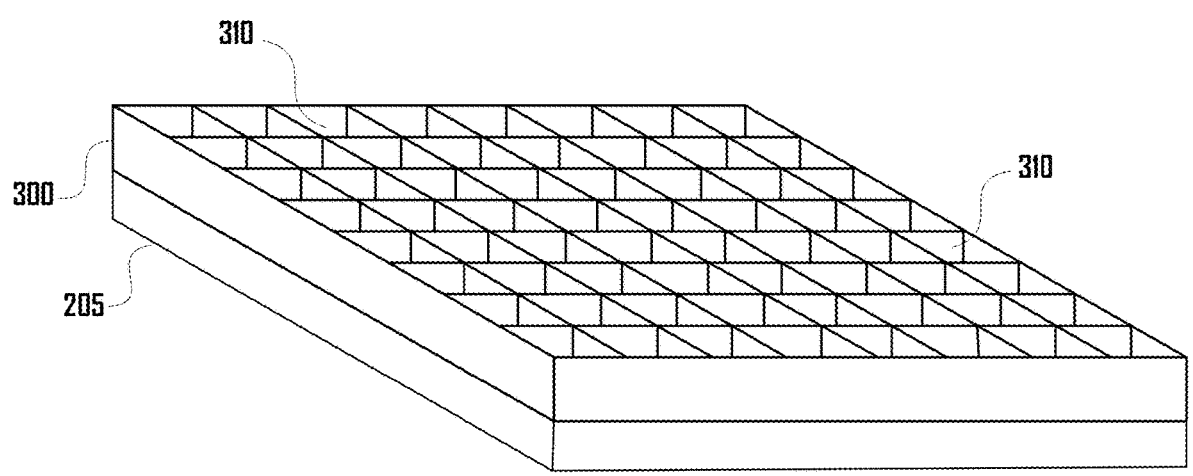
FIG. 3 is an exemplary diagram of an embodiment of a photo-cathode and grid.

FIG. 3 is an exemplary diagram showing a perspective view of an embodiment of a photo-cathode 205 and control grid 300. A control grid 300 is placed in direct contact with the photo-cathode 205, such that the control grid 300 creates a series of grid cells 310. Placing the control grid 300 in direct contact with the photo-cathode 205 allows an intense potential gradient to be created within each grid cell 310, as will be illustrated in FIGS. 5-9 herein. It should be noted that FIG. 3 is not intended to be to scale, and that the number, size, and shape of the grid cells 310 may vary without deviating from the intended scope.

Figure 4A:
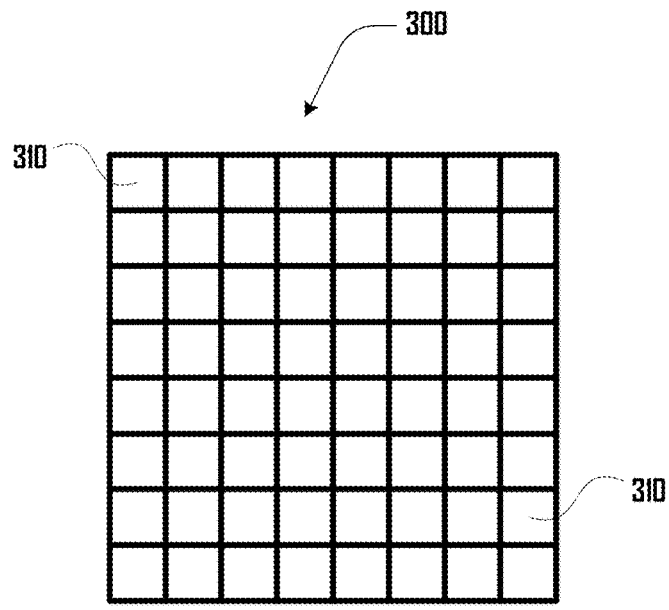
FIG. 4a is an exemplary diagram of an embodiment of a grid for focusing electrons emitted by a cathode.
Figure 4B:
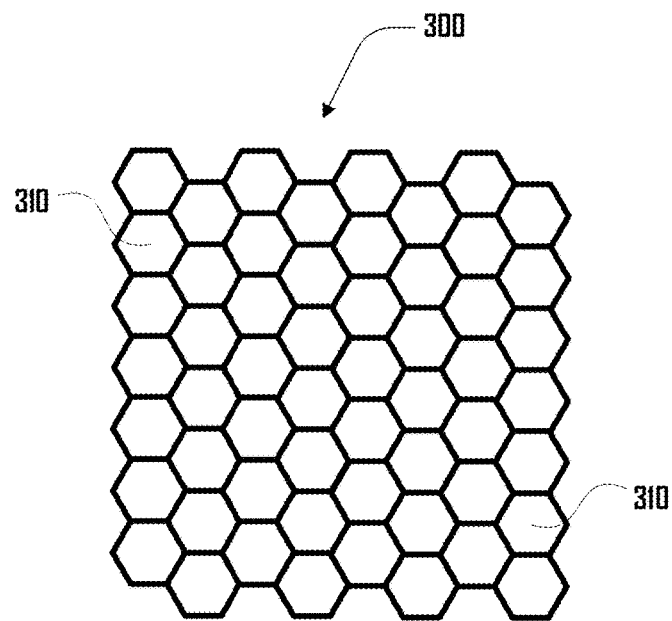
FIG. 4b is an exemplary diagram of an alternate embodiment of a grid for focusing electrons emitted by a cathode.

FIGS. 4a and 4b are exemplary diagrams of two alternate embodiments of a control grid for focusing electrons emitted by a cathode. FIG. 4A is a top view of an embodiment of a control grid 300 wherein the walls and support structure of the control grid 300 create square or rectangular grid cells 310. FIG. 4b is a top view of an alternate embodiment of a control grid 300 wherein the walls and support structure of the control grid 300 create hexagonal grid cells 310. FIGS. 4A and 4B are intended as example embodiments only and are not meant to be limiting. Any appropriate shape may be used for the grid cells 310, creating any number of grid cells 310. In an alternate embodiment, the various grid cells 310 may vary in size and shape over the surface of the control grid 300. For example, the grid cells 310 and the walls created by the grid cells 310 may vary in size and shape over the control grid 300 such that the amount of light striking the surface of the photo-cathode beneath the control grid 300 is optimized. In addition, the overall shape of the control grid 300 and the photo-cathode 205 (FIG. 3) can be any appropriate shape, including, but not limited to, circular, oval, square, rectangular, trapezoidal, and hexagonal. In an embodiment, the size and/or shape of the control grid 300 may be different from the size and/or shape of the underlying photo-cathode 205. The photo-cathode 205 may be curved or angled, or may be any appropriate three-dimensional shape, including but not limited to spherical, cylindrical, convex, or concave. The control grid 300 may be shaped to stretch over the entire surface of the photo-cathode 205, or may only cover a portion thereof.

Figure 5:
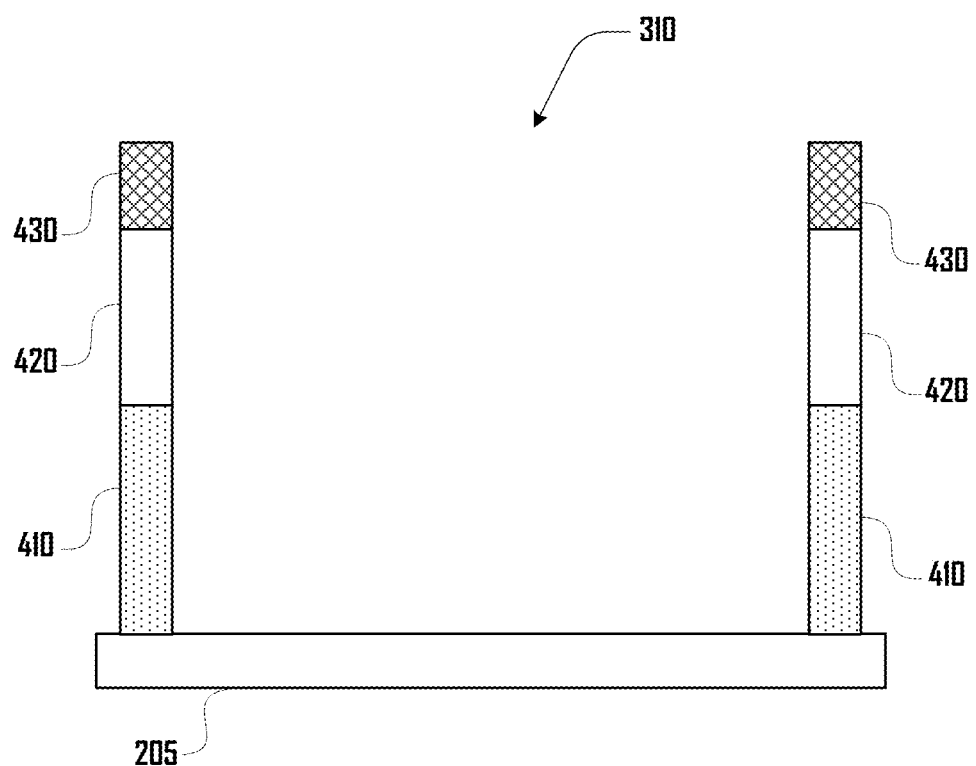
FIG. 5 is an exemplary diagram illustrating an embodiment of a cell of a grid for a cathode.

FIG. 5 is an exemplary diagram illustrating a cross-sectional view of an embodiment of a cell 310 of a control grid for a cathode. The walls of cell 310 are placed in direct contact with photo-cathode 205, and comprise multiple layers. The lowest layer of the wall (that is, the layer of the grid that is in contact with the photo-cathode 205) is deflection zone 410. Deflection zone 410 can be constructed of a conductive material including, but not limited to, aluminum, copper, nickel, a semiconductor (such as doped silicon or polysilicon), a composite material, or any appropriate material which provides the proper conductivity. Materials for deflection zone 410 can also be chosen based on ease of fabrication. As deflection zone 410 is conductive and in direct contact with the electron-emitting cathode 205, the voltage of the deflection zone 410 will remain at approximately zero volts relative to the cathode 205, and the deflection zone 410 can also conduct current across the surface of the photo-cathode to decrease resistance and increase efficiency.

In an embodiment, the next layer of the cell wall is an insulating zone 420. The material used for the insulating zone 420 can include, but is not limited to, glass, silicon, plastic, or any other appropriate material which is insulating and/or highly resistive electrically. The final layer in the wall structure in the embodiment of FIG. 5 is the grid zone 430. The grid zone can be made of a conductive material including, but not limited to, aluminum, copper, nickel, a composite material, or any appropriate material which provides the proper conductivity. The grid zone 430 will operate at a positive voltage relative to the cathode 205, which will draw electrons from cathode 205 and accelerate them toward the distant anode (not shown).

The dimensions shown in FIG. 5 for grid cell 310 are not intended to be to scale, and can be adjusted relative to one another based on design trade-offs and/or ease of fabrication. For example, in one embodiment, deflection zone 410 may be composed of a doped silicon material which is semiconductive in nature and relatively easy to deposit or otherwise place on cathode 205, insulating zone 420 may be glass, and grid zone 430 may be copper. In an embodiment, the height of deflection zone 410 may be approximately half of the height of the wall of grid cell 310, the insulating zone 420 may be approximately half of the height of the wall of grid cell 310, and grid zone 430 may be a thin coating on top of the insulating zone 420 relative to the respective heights of the deflection zone 410 and insulating zone 420. However, any appropriate heights may be used for zones 410, 420, and 430, and the dimensions of grid cell 310 can be modified as needed to achieve various performance results. The ratio of the width of the grid cell 310 cavity to the height of the walls of the grid cell 310 can be adjusted to optimize the amount of light reaching the surface of the photocathode 205. In an example embodiment, the width of the grid cell 310 can be approximately 5 times the height of the grid walls. However, any appropriate ratio of cell width to wall height may be used.

Figure 6:
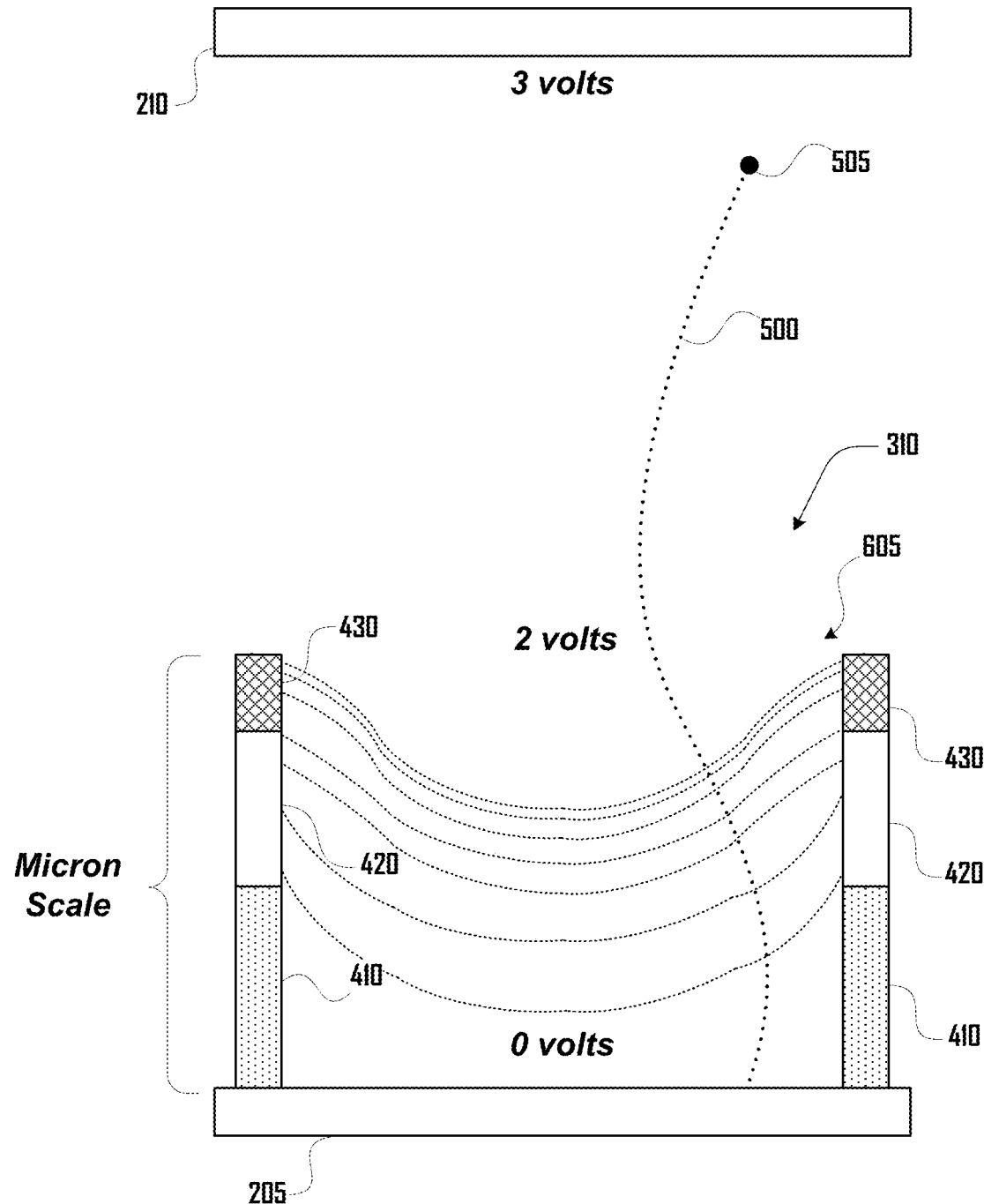
FIG. 6 is an exemplary diagram illustrating an example voltage gradient created by a cell of a grid for a cathode.

FIG. 6 is an exemplary diagram illustrating an example voltage gradient created by a grid cell 310 for a photocathode 205. In an embodiment, photo-cathode 205 emits electrons 505 which follow an electron path 500. In an example, photo-cathode 205 and the deflection zone 410 in direct contact with the can be at 0 volts. It should be noted that voltages used in the examples in this specification are exemplary and not intended to be limiting in any way, and that voltages may be relative values as compared to other components in the system and not necessarily absolute voltage values. Any appropriate voltage values can be used.

As the deflection zone 410 is in direct contact with photo-cathode 205, and therefore at a voltage of 0 volts relative to the photo-cathode 205, the path 500 of an electron 505 may be deflected away from the cell walls toward the center of grid cell 310. In the example of FIG. 6, the grid zone 430 is at a voltage of 2 volts relative to the photocathode 205, and thus an intense voltage gradient is created between the top of the deflection zone 410 and the grid zone 430. Although the voltage shown in this example at the grid zone 430 is a relatively low voltage (2 volts, in this example), the height of the grid walls can be in the order of microns (for example, 100 microns or less). This ratio of voltage to distance can create a very intense voltage potential gradient 605, which can be on the order of tens of thousands of volts per meter. This intense gradient will push electrons 505 out of the grid cell 310 quickly, allowing new, replacement electrons to be emitted by the photo-cathode 205, creating a strong current flow using a relatively low voltage.

Although the positive voltage of the grid zone 430 relative to the photo-cathode 205 can attract electrons 505, interrupting their travel toward anode 210, the electron paths 500 created by the arrangement of deflection zone 410, insulating zone 420, and grid zone 430 and the corresponding intense potential gradient 605 cause the majority of electrons 505 to be deflected toward the center of the grid cell 310 and pushed past the grid zone 430 toward the distant anode 210 before they can be captured by the grid zone 430. The ratio of the zones 410-430, the height of the grid walls, the width of grid cell 310, and the voltage levels applied can be adjusted as appropriate to shape electron paths 500 in an attempt to optimize the flow of electrons 505 between cathode 205 and anode 210.

Figure 10:
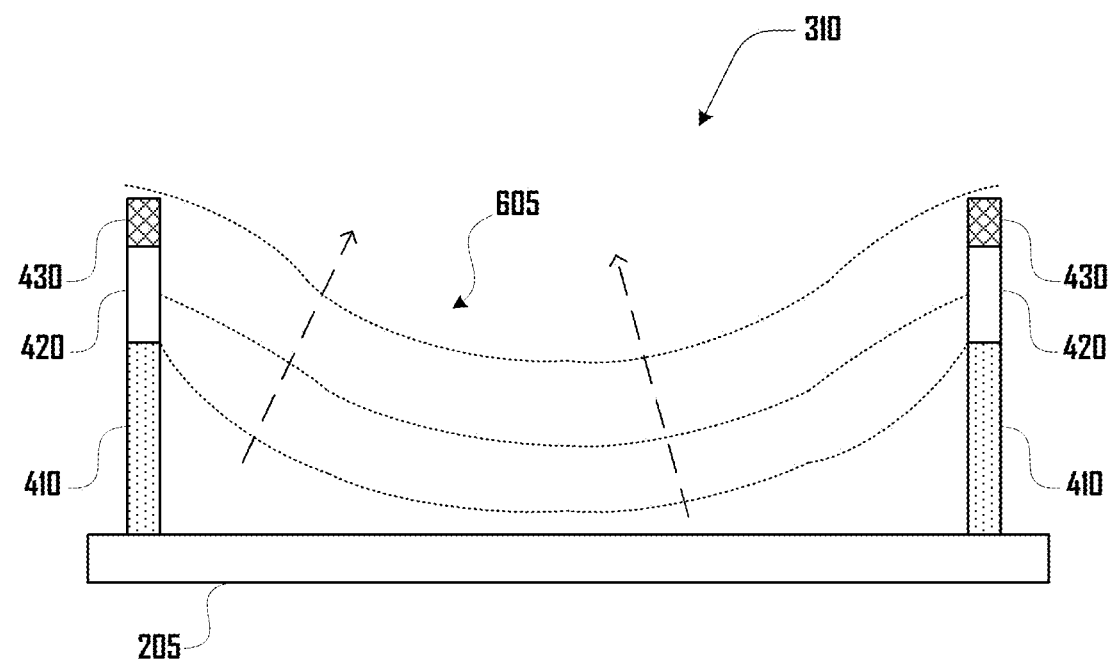
FIG. 10 is an exemplary diagram illustrating example concave voltage potentials of an embodiment of a cell of a grid for a cathode.

Also, in various embodiments (e.g., as shown in FIGS. 6 and 10), the potential gradient 605 can be concave. Such a concave potential gradient 605 can produce the effect of steering electrons away from the grid cell 310. For example, the gradients of force 650 can be focusing towards the center of the grid cell 310 as shown in FIG. 10.

Figure 7:
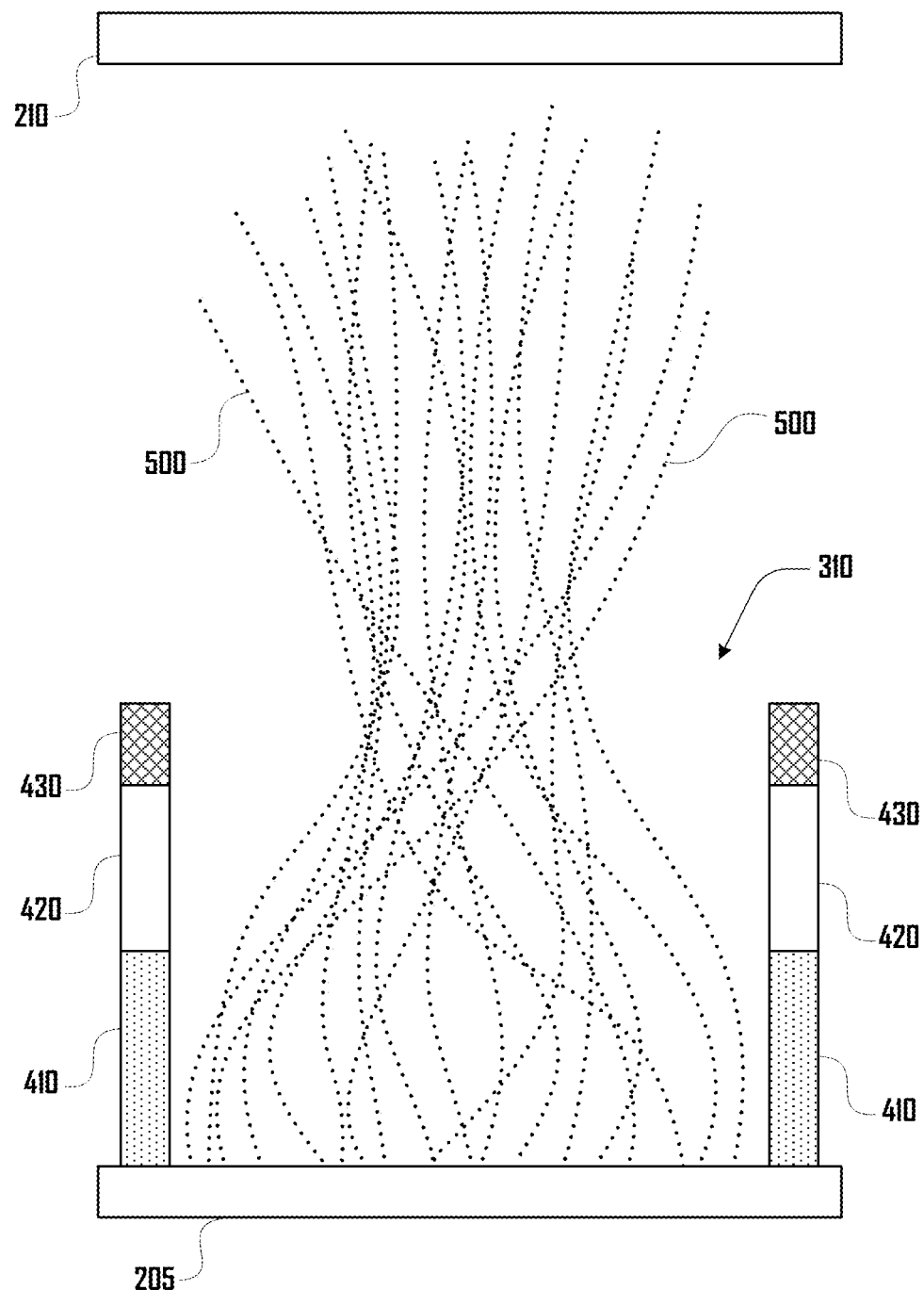
FIG. 7 is an exemplary diagram illustrating how electrons emitted from a cathode travel toward an anode in relation to a cell of a grid for a cathode.

FIG. 7 is an exemplary diagram illustrating how electrons emitted from a cathode travel toward an anode in relation to a grid cell 310 for a cathode. Whereas FIG. 6 illustrated the intense potential gradient generated within a grid cell 310, FIG. 7 illustrates how a large number of electron paths 500 are shaped because of the control grid. As electrons are emitted by the photo-cathode 205, they are deflected toward the middle of the grid cell 310 by the 0 voltage on deflection zone 410 (relative to the voltage of the photo-cathode 205). Then the electrons (not shown) are caught by the intense potential gradient formed by the layers of the walls of grid cell 310, the deflection zone 410, the insulating zone 420, and the grid zone 430. As illustrated by electron paths 500 in FIG. 7, as the electrons were deflected toward the center of grid cell 310 by the deflection zone 410, they are far enough away from the grid zone 430 when they are pushed out of the grid cell 310 by the potential gradient, preventing them from being attracted to the grid zone 430. The electron paths 500 then travel through the rectifier toward distant anode 210. As with FIG. 6, FIG. 7 is not intended to be drawn to scale, and is used to demonstrate concepts only. The anode 210, cathode 205, and the grid cell 310 are shown without any of the surrounding structure, such as the vacuum chamber 235 or enclosed vacuum 225 of FIG. 2, for the purposes of clarity.

Figure 8:
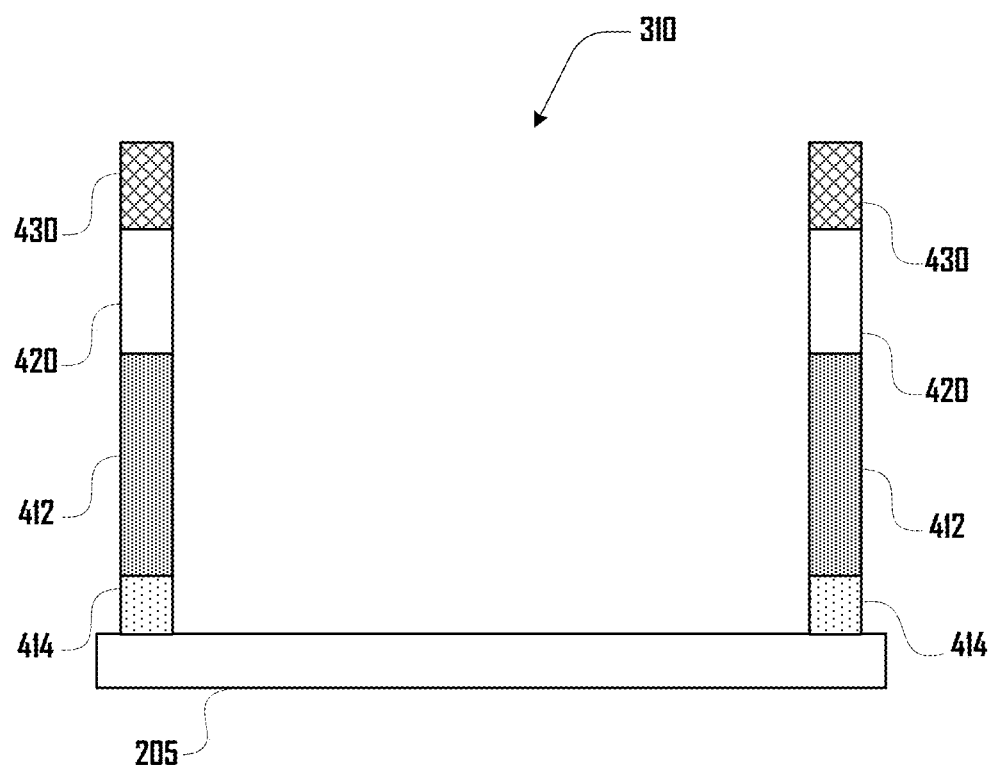
FIG. 8 is an exemplary diagram illustrating an alternate embodiment of a cell of a grid for a photo-cathode.

FIG. 8 is an exemplary diagram illustrating an alternate embodiment of a grid cell 310 for a photo-cathode. In this embodiment, an alternate method of forming the grid cell walls can be used to create grid walls of sufficient height using standard manufacturing techniques. For example, in the example shown, the deflection zone 410 of FIGS. 5-7 can be created by a combination of a highly conductive zone 414 and a less conductive zone 412, wherein the material for the less conductive zone 412 can be a semiconductor material which may be deposited in thicker layers more easily than the materials used for the highly conductive zone 414, thereby enabling the height necessary to displace the insulating zone 420 and grid zone 430 while still contributing to the creation of a deflection zone. The highly conductive zone 414, in contact with the cathode 205, allows for the distribution of current across the cathode 205, while the less conductive zone 412 contributes to the deflection of electrons and provides sufficient height off the cathode 205 to create the proper electron lensing effects for the circuit.

Figure 9:
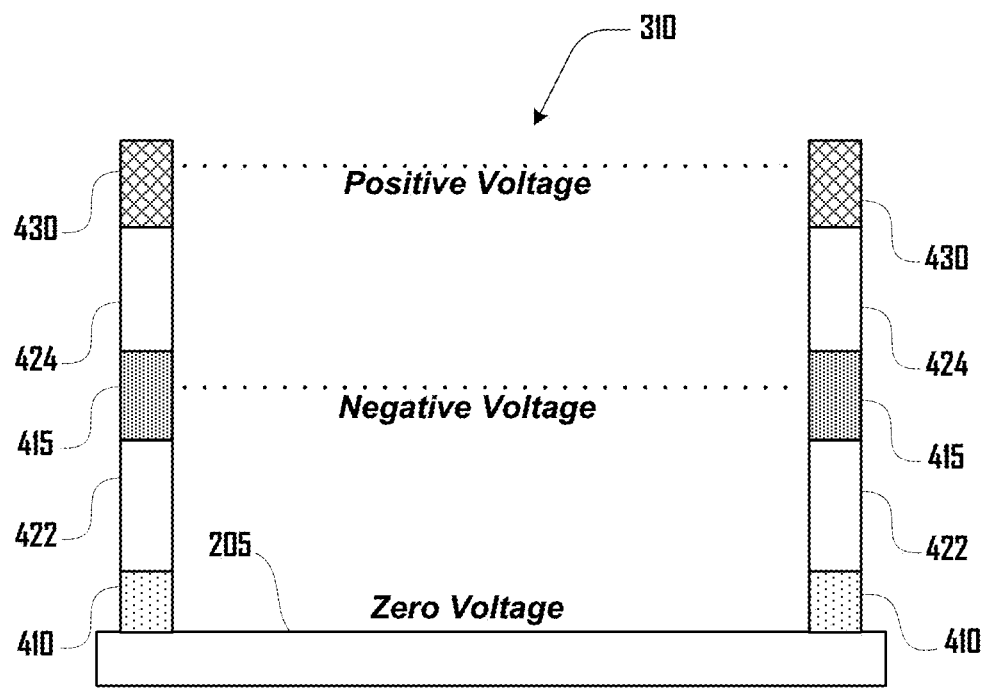
FIG. 9 is an exemplary diagram illustrating an alternate embodiment of a cell of a grid for a photo-cathode.

FIG. 9 is an exemplary diagram illustrating another alternate embodiment of a grid cell 310 for a photo-cathode which may provide improved electron lens effects for guiding electrons away from the control grid toward the anode. In this example embodiment, there is a base deflection zone 410 which is conductive and in contact with cathode 205. Above this is second deflection zone 415 which is at a negative voltage relative to the cathode 205, and which can increase the amount of deflection toward the center of grid cell 310. The base deflection zone 410 and the second deflection zone 415 can be separated by a first insulating later 422. Above the second deflection zone 415, there is a grid zone 430, which is at a positive voltage relative to the cathode 205 and which creates the intense potential gradient within grid cell 310 to aid in pushing electrons out of the grid cell 310 toward the anode (not shown). The grid zone 430 and second deflection zone 415 can be separated by a second insulating layer 424. Adjustments can be made to the dimensions of the grid cell 310, including the height of the zones comprising the grid cell walls and the width of the cavity of the grid cell 310, and the voltage levels can be modified as needed to shape the resulting electron paths as the electrons are emitted by the photo-cathode 205 and travel toward the anode (not shown).

The electron lens may use additional elements. For example, there could be a base deflection wall (110) which is a conductor resting upon the photo-cathode (100), then a first level of insulator (121), then a deflection electrode (115) which is at a negative voltage relative to the photo-cathode, then another level of insulator (122), and then the grid (130) at a small positive voltage relative to the photo-cathode. In this design the deflection electrode may give superior performance in diverting electrons away from the grid.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A high-voltage switch, comprising:
    a cathode;
    an anode;
    a vacuum chamber, the vacuum chamber enclosing at least the cathode and the anode in a vacuum and holding the cathode and the anode in position such that a gap exists between them;
    an electrical circuit, the electrical circuit connected to and supplying a voltage difference across the cathode and the anode; and
    a control grid, comprising:
        a deflecting layer;
        an insulating layer; and
        a grid layer, wherein the deflecting layer is in contact with the cathode, the insulating layer is between the deflecting layer and the grid layer, and the grid layer is at a positive voltage relative to the cathode,
    wherein a voltage gradient is created between the cathode and the grid layer which accelerates electrons emitted by the cathode toward the anode.

2. The high-voltage switch of claim 1, wherein the cathode is a photo-cathode.

3. The high-voltage switch of claim 2, wherein the deflecting layer is electrically conducting, and a voltage at the deflecting layer is substantially the same as a voltage at the photo-cathode.

4. The high-voltage switch of claim 1, wherein the cathode is a current dispenser cathode.

5. A control grid for a cathode, comprising a plurality of grid cells, each grid cell comprising:
    a deflecting layer;
    an insulating layer; and
    a grid layer,
    wherein the deflecting layer is in contact with the cathode, the insulating layer is between the deflecting layer and the grid layer, and the grid layer is at a positive voltage relative to the cathode, such that a voltage gradient is created between the cathode and the grid layer which accelerates electrons emitted by the cathode away from the cathode.

6. The control grid of claim 5, wherein a material of the deflecting layer is electrically conducting.

7. The control grid of claim 6, wherein the material of the deflecting layer is a semiconductor.

8. The control grid of claim 5, wherein the deflecting layer is a composite of a conducting material and a semiconducting material.

9. The control grid of claim 5, wherein the deflecting layer comprises a highly conducting sublayer and a less conducting sublayer.

10. The control grid of claim 5, wherein the insulating layer is a first insulating layer, and wherein the control grid further comprises a second insulating layer and a control ring layer, the control ring layer placed between the first insulating layer and the second insulating layer, the control ring layer having a negative voltage relative to the cathode.

11. The control grid of claim 5, wherein each grid cell of the plurality of grid cells is rectangular in shape.

12. The control grid of claim 5, wherein each grid cell of the plurality of grid cells is hexagonal in shape.

13. A method of controlling a flow of electrons from a cathode to an anode, comprising:
    placing a first layer of a control grid in contact with the cathode, the first layer being electrically conducting;
    placing a second layer of the control grid in contact with the first layer, the second layer being electrically insulating;
    placing a third layer of the control grid in contact with the second layer, the third layer being electrically conducting; and
    providing a voltage to the third layer of the control grid which is a positive voltage relative to a voltage of the cathode.

14. The method of claim 13, wherein the first layer is a semiconductor.

15. The method of claim 13, wherein the first layer is a composite of a conducting material and a semiconducting material.

16. The method of claim 13, wherein the first layer comprises a highly conducting sublayer and a less conducting sublayer.

17. The method of claim 13, further comprising placing a fourth layer and a fifth layer of the control grid between the second layer and the third layer, the fourth layer having a negative voltage relative to the cathode and placed in contact with the second layer and the fifth layer, and the fifth layer being electrically insulating and placed in contact with the fourth layer and the third layer, wherein the negative voltage of the fourth layer deflects electrons emitted by the cathode away from the control grid.

18. The method of claim 13, further comprising providing a voltage to the anode which is at least as positive as the voltage of the third layer.

* * * * *